United States Patent
Rämö et al.

(10) Patent No.: US 12,522,776 B2
(45) Date of Patent: Jan. 13, 2026

(54) PARAFFINIC PRODUCTS, A METHOD FOR PRODUCING PARAFFINIC PRODUCTS AND A USE OF PARAFFINIC PRODUCTS

(71) Applicant: Neste Oyj, Espoo (FI)

(72) Inventors: Virpi Rämö, Porvoo (FI); Jukka Hartikainen, Porvoo (FI)

(73) Assignee: NESTE OY, Espoo (FI)

( * ) Notice: Subject to any disclaimer, the term of this patent is extended or adjusted under 35 U.S.C. 154(b) by 159 days.

(21) Appl. No.: 17/628,816

(22) PCT Filed: Jul. 22, 2020

(86) PCT No.: PCT/EP2020/070608
§ 371 (c)(1),
(2) Date: Jan. 20, 2022

(87) PCT Pub. No.: WO2021/013860
PCT Pub. Date: Jan. 28, 2021

(65) Prior Publication Data
US 2022/0325161 A1    Oct. 13, 2022

(30) Foreign Application Priority Data
Jul. 22, 2019    (FI) ..................... 20195647

(51) Int. Cl.
| C10M 105/04 | (2006.01) |
| C09K 5/10 | (2006.01) |
| C10G 3/00 | (2006.01) |
| H01B 3/22 | (2006.01) |

(52) U.S. Cl.
CPC ............. *C10M 105/04* (2013.01); *C09K 5/10* (2013.01); *C10G 3/50* (2013.01); *H01B 3/22* (2013.01); *C10G 2300/304* (2013.01); *C10G 2300/308* (2013.01)

(58) Field of Classification Search
CPC ........ C10M 105/04; C10M 2203/0206; C10M 2203/1025; C10M 2205/173; C09K 5/10; C10G 3/50; C10G 2300/304; C10G 2300/308; C10G 45/00; H01B 3/22; H01M 10/656; H01M 10/613; C10N 2020/011; C10N 2020/015; C10N 2020/017; C10N 2020/069; C10N 2020/071; C10N 2020/081; C10N 2030/02; C10N 2030/08; C10N 2030/64; C10N 2030/74; C10N 2040/14; C10N 2040/16; C10N 2070/00; Y02E 60/10; Y02P 30/20

See application file for complete search history.

(56) References Cited

U.S. PATENT DOCUMENTS

2004/0059174 A1    3/2004   Houzvicka et al.

FOREIGN PATENT DOCUMENTS

| EP | 2368967 A1 | 9/2011 | |
| EP | 2770512 A1 | 8/2014 | |
| EP | 2990462 A1 | 3/2016 | |
| EP | 3095838 A1 | 11/2016 | |
| EP | 3315586 A1 | 5/2018 | |
| EP | 3315587 A1 * | 5/2018 | ............... C10G 3/50 |
| EP | 3315590 A1 | 5/2018 | |
| EP | 3315592 A1 | 5/2018 | |
| JP | 2017503855 A | 2/2017 | |
| JP | 2018519374 A | 7/2018 | |
| WO | 9856876 A1 | 12/1998 | |
| WO | 2014128227 A1 | 8/2014 | |
| WO | 2015101837 A2 | 7/2015 | |
| WO | 2016185046 A1 | 11/2016 | |
| WO | 2018078021 A1 | 5/2018 | |
| WO | 2018078022 A1 | 5/2018 | |
| WO | 2018078024 A1 | 5/2018 | |
| WO | WO-2018115589 A1 * | 6/2018 | .......... C10M 101/02 |
| WO | 2019092379 A2 | 5/2019 | |

OTHER PUBLICATIONS

International Search Report (PCT/ISA/210) and Written Opinion (PCT/ISA/237) mailed on Nov. 4, 2020, by the European Patent Office as the International Searching Authority for International Application No. PCT/EP2020/070608.
Renewable Fluids Biolife, BioLife: Renewable Isoparaffins from Biomass, downloaded from internet https://specialfluids.totalenergies.com/en/products-and-services/biolife-biomass-based-renewable-isoalkanes (9 pages).
Office Action issued on Feb. 13, 2024, by the Japanese Patent Office in corresponding Japanese Patent Application No. 2022-502304, and an English Translation of the Office Action. (13 pages).
Office Action issued on Nov. 10, 2025, by the Brazilian Patent Office in corresponding Brazilian Patent Application No. BR112022000039-1, and a machine English Translation of the Office Action. (6 pages).

* cited by examiner

*Primary Examiner* — Taiwo Oladapo
(74) *Attorney, Agent, or Firm* — Buchanan Ingersoll & Rooney PC

(57) ABSTRACT

An electrotechnical fluid composition, comprising more than 90 wt-% paraffins in the C17-C18 range, based on the total weight of the composition, is described. The ratio of the amount of C18 i-paraffins to the amount of C18 n-paraffins is more than 40, based on the weight of the C18 i-paraffins and the weight of the C18 n-paraffins in the composition.

19 Claims, No Drawings

PARAFFINIC PRODUCTS, A METHOD FOR PRODUCING PARAFFINIC PRODUCTS AND A USE OF PARAFFINIC PRODUCTS

FIELD OF THE INVENTION

The present invention relates to an electrotechnical composition comprising paraffin fractions obtained from renewable raw materials, to a method for producing said composition and to a use of said composition.

BACKGROUND

Liquid or gaseous electrotechnical fluids are used in electrical apparatuses such as transformers, capacitors, switchgears, bushings, etc. Electrotechnical fluids typically act as an electrically insulating medium separating the high voltage and grounded parts within the apparatus and functioning as a cooling medium to transfer the heat generated in the apparatus. In addition to the above mentioned basic function the electrotechnical fluid should comply with other necessary and desired requirements such as long operational life time, operation in wide range of temperatures, suitable kinematic viscosity and minimal environmental impact.

There is a growing end need for sustainable, biosourced and recycled alternatives in the field of electrotechnical fluids.

In the electrotechnical fluids segment, there is a clear end user need to develop solutions that offer low conductivity combined with other improved characteristics. Current solutions do not typically meet the criteria.

WO 2014128227 discloses a renewable hydrocarbon based insulating fluid which comprises more than 70% isoparaffins. This disclosure does not teach how to produce a fluid which meets the required performance or the composition of a fluid which meets the required performance.

WO 2018078024 discloses an electrotechnical fluid for an electric vehicle, having a boiling point in the range of from 200° C. to 400° C. and a boiling range below 80° C., said fluid comprising more than 95% isoparaffins and less than 3% naphthens by weight, a biocarbon content of at least 95% by weight, containing less than 100 ppm aromatics by weight. This disclosure does not teach how to produce a fluid which meets the required performance or the composition of a fluid which meets the required performance.

SUMMARY

An object of the present invention is to provide a hydrocarbon composition which is suitable as electrotechnical fluid and which alleviates the disadvantages discussed above. The present invention also relates to a method of making an electrotechnical fluid having low conductivity combined with other improved characteristics. In addition, the invention relates to the use of an electrotechnical fluid.

More specifically the composition according to present invention comprises more than 90 wt-% paraffins in the C17-C18 range, based on the total weight of the composition, wherein the ratio of the amount of C18 i-paraffins to the amount of C18 n-paraffins is more than 40, based on the weight of the C18 i-paraffins and the weight of the C18 n-paraffins in the composition.

The experimental part shows surprisingly good properties of the electrotechnical fluid according to present invention.

DETAILED DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising", "containing" and "including" should be understood as not limiting the described embodiments to consist of only those features that have been mentioned and such embodiments may contain also features/structures that have not been specifically mentioned.

All standards referred herein are the latest revisions available, unless otherwise mentioned.

The present invention relates to a paraffinic hydrocarbon product which has surprisingly good performance as an electrotechnical fluid.

The present invention discloses a method for production of an electrotechnical fluid, an electrotechnical fluid and use of an electrotechnical fluid. More specifically, the present invention discloses a method for production of electrotechnical fluid comprising hydrodeoxygenation and isomerization of renewable feedstock to obtain a renewable paraffinic feed; and subjecting the obtained renewable paraffinic feed to at least one separation, or fractionation, process to recover a hydrocarbon composition having a boiling range within a range from about 275° C. to about 300° C. (EN ISO3405: 2011), preferably within a range from about 280° C. to about 300° C., which is useful as an electrotechnical fluid. The present invention discloses also uses of the electrotechnical fluid.

The renewable paraffinic feed may be obtained by hydrodeoxygenation and isomerization of renewable (biosourced) raw material.

The renewable paraffinic feed thus obtained has a carbon number distribution in the range of C8-C22 or C10 to C20, preferably in the range of C15 to C18, and a boiling range within 140° C-340° C., preferably within a range of 180° C.-320° C. The renewable paraffinic feed comprises mainly n-paraffins and i-paraffins.

In an embodiment, the renewable paraffinic feed for the separation/fractionation is provided by catalytic hydrotreatment and catalytic isomerization of renewable raw material.

In another embodiment, the hydrotreatment is catalytic hydrodeoxygenation.

In another embodiment, the separation process comprises distillation.

The boiling range covers a temperature interval from the initial boiling point, IBP, defined as the temperature at which the first drop of distillation product is obtained, to a final boiling point, FBP, when the highest-boiling compounds evaporate.

EN ISO 3405:2011 and ASTM D86:2015 standards "Standard Test Method for Distillation of Petroleum Products and Liquid Fuels at Atmospheric Pressure", as well as ASTM D7345:2017 standard "Standard Test Method for Distillation of Petroleum Products and Liquid Fuels at Atmospheric Pressure (Micro Distillation Method)" describe a distillation method for measuring the boiling point distribution of liquid fuel products having boiling range within a range from 0° C. to 400° C. (ASTM D7345: 20° C. to 400° C.). Using ASTM D86 or ASTM D7345, boiling points are measured at 25 vol-% distilled. The points may also be reported at 88% distilled.

Description of the Process

By the term "hydrotreatment" is meant a catalytic process of organic material by all means of molecular hydrogen. Preferably, hydrotreatment removes oxygen from organic oxygen compounds as water i.e. by hydrodeoxygenation (HDO). Additionally/alternatively, hydrotreatment may remove sulphur from organic sulphur compounds as dihydrogen sulphide ($H_2S$), i.e. by hydrodesulphurisation, (HDS), remove nitrogen from organic nitrogen compounds as ammonia ($NH_3$), i.e. by hydrodenitrofication (HDN), and/or remove halogens, for example chlorine, from organic chloride compounds as hydrochloric acid (HCl), i.e. by hydrodechlorination (HDCl).

By the term "hydrodeoxygenation" (HDO), of for example triglycerides or other fatty acid derivatives or fatty acids, is meant the removal of for example carboxyl oxygen as water by means of molecular hydrogen under the influence of a catalyst.

Reaction conditions and catalysts suitable for the hydrodeoxygenation of renewable raw material and the isomerization of resultant n-paraffins are known. Examples of such processes are presented in FI100248, Examples 1-3, and in WO 2015/101837 A2.

By the term "deoxygenation" is meant removal of oxygen from organic molecules, such as fatty acid derivatives, alcohols, ketones, aldehydes and/or ethers, by any means previously described, or decarboxylation or decarbonylation.

Renewable Raw Material

Renewable raw material (or renewable oil and/or fat) refers to a feedstock derived from a biological raw material component containing oils and/or fats, usually containing lipids (e.g. fatty acids or glycerides), such as plant oil/fats, vegetable oil/fats, animal oil/fats, fish oil/fats and algae oil/fats, or oil/fats from other microbial processes, for example, genetically manipulated algae oil/fats, genetically manipulated oil/fats from other microbial processes and also genetically manipulated vegetable oil/fats. Components or derivatives of such materials may also be used, for example, alkyl esters (typically C1-05 alkyl esters, such as methyl, ethyl, propyl, iso-propyl, butyl, sec-butyl esters) or olefins. Renewable specifically excludes fossil sources, however recycled fossil material may be utilized.

The renewable oils and/or fats may include a single kind of oil, a single kind of fat, mixtures of different oils, mixtures of different fats, mixtures of oil(s) and fat(s), fatty acids, glycerol, and/or mixtures of the afore-mentioned.

These oils and/or fats typically comprise C10-C24 fatty acids and derivatives thereof, including esters of fatty acids, glycerides, i.e. glycerol esters of fatty acids. The glycerides may specifically include monoglycerides, diglycerides and triglycerides.

Carbon atoms of renewable or biological origin comprise a higher number of unstable radiocarbon ($^{14}C$) atoms compared to carbon atoms of fossil origin. Therefore, it is possible to distinguish between carbon compounds derived from renewable or biological sources or raw material and carbon compounds derived from fossil sources or raw material by analysing the ratio of $^{12}C$ and $^{14}C$ isotopes. Thus, a particular ratio of said isotopes can be used as a "tag" to identify renewable carbon compounds and differentiate them from non-renewable carbon compounds. The isotope ratio does not change in the course of chemical reactions. Examples of a suitable method for analysing the content of carbon from biological or renewable sources are DIN 51637 (2014), ASTM D6866 (2020) and EN 16640 (2017). As used herein, the content of carbon from biological or renewable sources is expressed as the biogenic carbon content meaning the amount of biogenic carbon in the material as a weight percent of the total carbon (TC) in the material (in accordance with ASTM D6866 (2020) or EN 16640 (2017)).

Feedstock or raw material of biological origin means material having typically only biogenic carbon content.

Typically hydrocarbons made from 100% palm oil have a biogenic carbon content of about 100 wt-%.

Typically hydrogenated animal fat has a biogenic carbon content of about 100 wt-%.

Typically fossil crude oil based diesel fuel has a biogenic carbon content of about 0 wt-%.

In an embodiment the biogenic carbon content of the feedstock or renewable raw material, or a renewable paraffinic feed obtainable therefrom, is more than 50 wt-%, preferably the biogenic carbon content is more than 90 wt-% and most preferably the biogenic carbon content is more than 99 wt-%.

Renewable Paraffinic Feed and Preparation Thereof

The preparation of a renewable paraffinic feed often involves reactions removing oxygen from the renewable feedstock, and there are a number of strategies for doing this. The deoxygenation may comprise one or more of following reactions:

1) hydrodeoxygenation (HDO), hydrogenation of oxygen bonds—removing oxygen as $H_2O$, 2) decarboxylation where oxygen is removed in the form of $CO_2$, and 3) decarbonylation where oxygen is removed in the form of CO.

Process conditions for hydrodeoxygenation are known in the art. For example, the hydrodeoxygenation of renewable raw material may be carried out on a metal sulphide catalyst. The metal may be one or more Group VI metals, such as Mo or W, or one or more Group VIII non-noble metals such as Co or Ni. The catalyst may be supported on any convenient support, such as alumina, silica, zirconia, titania, amorphous carbon, molecular sieves or combinations thereof. Usually the metal is impregnated or deposited on the support as metal oxides. They are then typically converted into their sulphides. Examples of typical catalysts for hydrodeoxygenation are molybdenum containing catalysts, NiMo, CoMo, or NiW catalysts, supported on alumina or silica, but many other hydrodeoxygenation catalysts are known in the art, and have been described together with or compared to NiMo and/or CoMo catalysts. The hydrodeoxygenation is preferably carried out under the influence of sulphided NiMo or sulphided CoMo catalysts in the presence of hydrogen gas.

The hydrodeoxygenation may be performed under a hydrogen pressure from 10 to 200 barg (bar gauge), at temperatures from 200° C. to 400° C., and liquid hourly space velocities of 0.2 $h^{-1}$ to 10 $h^{-1}$. During the hydrodeoxygenation step using a sulfided catalyst, the sulfided state of the catalyst may be maintained by the addition of sulphur in the gas phase or by using a feedstock having sulphur containing mineral oil blended with the renewable feedstock. The sulphur content of the total feed being subjected to hydrodeoxygenation may be, for example, in the range of 50 wppm (ppm by weight) to 20 000 wppm, preferably in the range of 100 wppm to 1000 wppm.

Effective conditions for hydrodeoxygenation may reduce the oxygen content of the feedstock to less than 1 wt-%, such as less than 0.5 wt-% or less than 0.2 wt-%. In some cases, the conditions may be selected to yield partial hydrodeoxygenation corresponding to a deoxygenation of at least 40 wt-%, at least 50 wt-% or at least 75 wt-%.

The renewable paraffinic feed usable in the present invention may be provided by isomerizing a hydrotreated renewable raw material obtained from the renewable raw material. Generally, the renewable paraffinic feed may be produced from the renewable raw material using any known method.

Specific examples of a method for producing the renewable paraffinic feed are provided in the European patent application EP 1741768 A1. Also other methods may be employed, particularly another BTL (Biomass-To-Liquid) method may be chosen, for example biomass gasification followed by a Fischer-Tropsch method.

In a preferred embodiment, preparing a renewable paraffinic feed from a renewable raw material comprises subjecting the renewable raw material to a deoxygenation treatment. Most renewable raw materials comprise materials having a high oxygen content. In one embodiment, the renewable feedstock comprises fatty acids, or fatty acid derivatives, such as triglycerides, or a combination thereof.

In the present invention, the deoxygenating method is not particularly limited and any suitable deoxygenating method may be employed. Suitable methods are, for example, hydrotreatment, such as hydrodeoxygenation (HDO), catalytic hydrodeoxygenation (catalytic HDO), catalytic cracking (CC), or a combination thereof. Other suitable methods include decarboxylation and decarbonylation reactions, either alone or in combination with hydrotreatment.

In a preferred embodiment, the deoxygenation treatment, to which the renewable raw material is subjected, is hydrotreatment. Preferably, the renewable raw material is subjected to hydrodeoxygenation (HDO) which preferably uses a HDO catalyst. Catalytic HDO is the most common way of removing oxygen and has been extensively studied and optimized. However, the present invention is not limited thereto. As the HDO catalyst, a HDO catalyst comprising hydrogenation metal supported on a carrier may be used. Examples include a HDO catalyst comprising a hydrogenation metal selected from a group consisting of Pd, Pt, Ni, Co, Mo, Ru, Rh, W, or a combination of these. Alumina or silica is suited as a carrier, among others. The hydrodeoxygenation step may, for example, be conducted at a temperature of 100-500° C. and at a pressure of 10-150 bar (absolute).

Preparing a hydrotreated raw material from the renewable raw material may comprise a step of hydrocracking hydrocarbons in the renewable hydrocarbon raw material. Thus, the chain length of the renewable hydrocarbon raw material may be adjusted and the product distribution of the produced mixture of biohydrocarbons can be indirectly controlled.

Isomerization Treatment

The renewable paraffinic feed of the present invention may be provided by subjecting at least straight chain hydrocarbons in the hydrotreated raw material to an isomerization treatment to prepare the renewable paraffinic feed. The renewable paraffinic feed and its preparation is described above.

The isomerization treatment causes branching of hydrocarbon chains, i.e. isomerization, of the hydrotreated raw material. Branching of hydrocarbon chains improves cold properties, i.e. the isomeric composition formed by the isomerization treatment has better cold properties compared to the hydrotreated raw material.

The isomerization step may be carried out in the presence of an isomerization catalyst, and optionally in the presence of hydrogen added to the isomerisation process. Suitable isomerisation catalysts contain a molecular sieve and/or a metal selected from Group VIII of the periodic table and optionally a carrier. Preferably, the isomerization catalyst contains SAPO-11, or SAPO-41, or ZSM-22, or ZSM-23, or fernerite, and Pt, Pd, or Ni, and $Al_2O_3$, or $SiO_2$. Typical isomerization catalysts are, for example, Pt/SAPO-11/$Al_2O_3$, PUZSM-22/$Al_2O_3$, PUZSM-23/$Al_2O_3$, and Pt/SAPO-11/$SiO_2$. The catalysts may be used alone or in combination. The presence of added hydrogen is particularly preferable to reduce catalyst deactivation. In a preferred embodiment, the isomerization catalyst is a noble metal bifunctional catalyst, such as Pt-SAPO and/or Pt-ZSM-catalyst, which is used in combination with hydrogen. The isomerization step may, for example, be conducted at a temperature of 200-500° C., preferably 280-400° C., and at a pressure of 10-150 bar, preferably 30-100 bar (absolute). The isomerization step may comprise further intermediate steps such as a purification step and a fractionation step. The isomerization may be performed e.g. at 300° C. to 350° C.

Incidentally, the isomerization treatment is a step which predominantly serves to isomerize the hydrotreated raw material. That is, while most thermal or catalytic conversions (such as HDO) result in a minor degree of isomerization (usually less than 5 wt-%), the isomerization step which may be employed in the present invention is a step which leads to a significant increase in the content of isoparaffins.

Thus the renewable raw material may be subjected at least to a hydrodeoxygenation reaction in the presence of hydrogen and a hydrodeoxygenation catalyst and optionally to an isomerisation reaction in the presence of an isomerisation catalyst, for obtaining the renewable paraffinic feed. When a hydrodeoxygenation step and an isomerisation step are applied, these may be performed either simultaneously or in sequence. The hydrodeoxygenation reaction may be performed in the presence of hydrogen gas and a hydrodeoxygenation catalyst, such as CoMo, NiMo, NiW, CoNiMo, on a support, for example, an alumina support, zeolite support, or a mixed support. The hydrodeoxygenation reaction may, for example, be conducted at a temperature in the range from 250 to 400° C., and at a pressure in the range from 20 to 80 barg, at a WHSV (weight hourly space velocity, i.e. mass flow/catalyst mass) in the range from 0.5 to 3 $h^{-1}$, and a H2/oil ratio of 350-900 nl/l, using a catalyst, such as NiMo, optionally on an alumina support.

The product of the hydrodeoxygenation step, i.e. the hydrotreated renewable raw material, may be subjected to an isomerization step in the presence of hydrogen and an isomerization catalyst. The isomerisation catalyst may be a noble metal bifunctional catalyst such as Pt-SAPO or Pt-ZSM catalyst or NiW. The isomerization reaction may, for example, be conducted at a temperature of 250-400° C. and at a pressure of 10-60 barg. The isomerisation reaction may, for example, be conducted at a temperature of 250-400° C., at a pressure of between 10 and 60 barg, at a WHSV of 0.5-3 $h^{-1}$, and at a H2/oil ratio of 100-800 nl/l.

The hydrodeoxygenation and hydroisomerisation steps may be carried out in a single step on the same catalyst bed using a single catalyst for this combined step, e.g. NiW, or a Pt catalyst, such as Pt/SAPO in a mixture with a Mo catalyst on a support, e.g. NiMo on alumina.

Fractionation Step

Any known separation/fractionation method, or combination thereof, may be used in the production of an electrotechnical fluid composition according to the present invention from the renewable paraffinic feed to recover a hydrocarbon composition having a boiling range within a range from about 275 ° C. to about 300° C. (EN ISO3405: 2011), preferably within a range from about 280° C. to about 300° C. Exemplary boiling ranges include about 275° C. to about 300° C., and about 280° C. to about 300° C. (EN ISO3405:2011). Preferably the separation is selected so that a majority of the C18 normal paraffins end up in the residue, and majority of the C18 i-paraffins end up in the recovered hydrocarbon composition. By selecting the final boiling point in this way, it is possible to control the viscosity of the recovered hydrocarbon composition. Also the amount of impurities may be reduced as they typically concentrate in the heavier hydrocarbon bottom.

In one embodiment an electrotechnical fluid composition is produced by subjecting the renewable paraffinic feed to at least one separation process comprising distillation.

In one embodiment the initial boiling point of the electrotechnical fluid composition, IBP, is about 275° C. and preferably about 280° C. and the final boiling point, FBP, is about 300° C. (EN-ISO3405:2011).

In one embodiment the process comprises two or more separation steps.

Selection of renewable feedstock regarding favourable characteristics, such as selecting a renewable feedstock having a high amount of compounds having carbon chain length longer than or equal to C16, may be used to increase the yield of the electrotechnical fluid composition.

The yield of electrotechnical fluid composition may be increased also by the selection of the process conditions in the renewable paraffinic feed production process.

In an embodiment an electrotechnical fluid composition comprises more than 90 wt-% paraffins in the C17-C18 range, based on the total weight of the composition, wherein the ratio of the amount of C18 i-paraffins to the amount of C18 n-paraffins is more than 40, based on the weight of the C18 i-paraffins and the weight of the C18 n-paraffins in the composition. This composition has surprisingly good performance. The high share of C17-C18 paraffins increases the flash point of the composition, while the high weight ratio of C18 i-paraffins to C18 n-paraffins provides lower viscosity and thus better fluidity, this combination ensuring safe use in broad range of different electrotechnical fluid applications, over a wide temperature range. The better fluidity ensures e.g. more efficient heat transfer which improves for example efficiency of transformers and decreases their operating temperature, which in turn allows higher power output. Also risk of local hot spots is reduced, thereby improving lifetime of the electrotechnical fluid, and safety. More efficient cooling may also allow smaller transformer designs reducing cost and need for space.

In one embodiment the electrotechnical fluid composition comprises less than 95 wt-% paraffins in C17-C18 range, based on the total weight of the composition. This composition denotes good performance.

In one embodiment the electrotechnical fluid composition has a total isoparaffinic content of more than 90 wt-%, based on the total weight of the composition. This improves cold performance, including enhanced fluidity at low temperatures.

In one embodiment the electrotechnical fluid composition has a pour point less than −50° C., preferably less than −55° C., more preferably less than −60° C. or less than −65° C. (ASTMD5950)

In one embodiment the electrotechnical fluid composition comprises less than 2 wt-% C15 and lighter paraffins and less than 2 wt-% C20 and heavier paraffins, based on the total weight of the composition. This composition denotes good performance.

In one embodiment the electrotechnical fluid composition has a flash point of at least 135° C., preferably at least 140° C., more preferably at least 145° C. (ENISO2719:2016).

In one embodiment the electrotechnical fluid composition comprises at most 2 wt-% C19 paraffins, such as between 1 wt-% and 2 wt-% C19 paraffins, based on the total weight of the composition. This composition denotes good performance.

In one embodiment the electrotechnical fluid composition comprises at most 10 wt-% C16 paraffins, such as between 2 wt-% and 10 wt-% C16 paraffins, preferably at most 6 wt-% C16 paraffins, such as between 2 wt-% and 6 wt-% C16 paraffins, based on the total weight of the composition. This composition denotes good performance.

In one embodiment the electrotechnical fluid composition comprises more than 37 wt-% C17 paraffins, based on the total weight of the composition. This composition denotes good performance.

In one embodiment the electrotechnical fluid composition comprises less than 42 wt-% C17 paraffins, based on the total weight of the composition. This composition denotes good performance.

In one embodiment the electrotechnical fluid composition comprises more than 45 wt-%, preferably more than 48 wt-%, more preferably more than 50 wt-% C18 paraffins, based on the total weight of the composition. This composition denotes good performance.

In one embodiment the electrotechnical fluid composition comprises less than 57 wt-% C18 paraffins, based on the total weight of the composition. This composition denotes good performance.

In preferred embodiments the electrotechnical fluid composition comprises more than 90 wt-% paraffins in the C17-C18 range, based on the total weight of the composition, wherein the ratio of the amount of C18 i-paraffins to the amount of C18 n-paraffins is more than 40, based on the weight of the C18 i-paraffins and the weight of the C18 n-paraffins in the composition, and more than 45 wt-%, preferably more than 48 wt-%, more preferably more than 50 wt-% C18 paraffins, based on the total weight of the composition.

In one embodiment the ratio of the amount of C17 i-paraffins to the amount of C17 n-paraffins is more than 20, and preferably less than 30, based on the weight of the C17 i-paraffins and the weight of the C17 n-paraffins in the composition. This composition denotes good performance.

In one embodiment the electrotechnical fluid composition comprises 0.01-1 wt-% aromatics, preferably 0.01-0.5 wt-% aromatics, based on the total weight of the composition. This denotes good performance.

In one embodiment the electrotechnical fluid composition comprises 3-4 wt-% C16 i-paraffins, 35-40 wt-% C17 i-paraffins, 50-55 wt-% C18 i-paraffins, 1-3 wt-% C19 i-paraffins, 0.1-1 wt-% C16 n-paraffins, 0.5-2 wt-% C17 n-paraffins, 0.5-2 wt-% C18 n-paraffins and 0.01-1 wt-% C19 n-paraffins, based on the total weight of the composition. This denotes good performance.

In one embodiment the total isoparaffinic content of the composition is more than 90 wt-% and less than 98 wt-%, based on the total weight of the composition. This denotes good performance, especially in terms of reduced viscosity or enhanced fluidity, over a broad temperature range.

In one embodiment the ratio of the amount of C18 i-paraffins to the amount of C18 n-paraffins is between 42 and 47, based on the weight of the C18 i-paraffins and the weight of the C18 n-paraffins in the composition. This denotes good performance.

In one embodiment a conductivity at 22° C. (ISO6297:1997) is less than 1 pS/m and NOACK150 (ASTMD5800-15a B) is 8.5 wt-% or less. This denotes good performance.

In one embodiment the electrotechnical fluid composition has a density at 20° C. (EN ISO12185) between 782 and 784 kg/m$^3$, and a cloud point (ASTMD7689:2017) lower than −32° C. This denotes good performance.

In one embodiment the electrotechnical fluid composition has a biogenic carbon content more than 50 wt-%, preferably a biogenic carbon content more than 90 wt-% and most preferably a biogenic carbon content more than 99 wt-%. This reflects the origin of the raw material.

Preferably the electrotechnical fluid composition is classified as readily biodegradable according to OECD Test Guideline 301 F.

In one embodiment the electrotechnical fluid composition meets at least one specification defined in Table 2 General Specifications of standard IEC 60296:2012. In some embodiments the electrotechnical fluid composition may meet even all of the specifications defined in Table 2 General Specifications of standard IEC 60296:2012.

In some embodiments the electrotechnical fluid composition may further comprise one or more additives, for example selected from antioxidant additives, metal passivators, pour point depressants, additives decreasing gassing tendency, and any other additives commonly used in electrochemical fluids.

In one embodiment a method of producing an electrotechnical fluid composition, comprising:
conducting at least one hydrodeoxygenation reaction and at least one isomerization reaction of a renewable raw material to obtain a renewable paraffinic feed; and
subjecting the renewable paraffinic feed to at least one separation process to recover a hydrocarbon composition having a boiling range within a range from about 275° C. to about 300° C. (EN ISO3405:2011) preferably within a range from about 280° C. to about 300° C. . Preferably the recovered hydrocarbon composition has a boiling range from about 275° C. to about 300° C. (EN ISO3405:2011), more preferably from about 280° C. to about 300° C.

In one embodiment any of above mentioned compositions is used in an electrical device.

In one embodiment any of above mentioned compositions is used as a battery coolant, an insulating oil or a cable oil.

In one embodiment any of above mentioned compositions is used as an electric vehicle battery coolant.

In one embodiment any of above mentioned compositions is used as transformer oil or as a component of transformer oil.

In one embodiment any of above mentioned compositions is used as a server farm coolant.

The embodiments of the present disclosure may be combined, in whole or in part, with each other to form further embodiment(s) of the present disclosure. Further, the particular features or characteristics illustrated or described in connection with various embodiments may be combined, in whole or in part, with the features or characteristics of one or more other embodiments without limitation. Such modifications and variations are intended to be included within the scope of the present disclosure. A composition, a method or a use, to which the present disclosure is related, may comprise at least one of the embodiments of the present disclosure described in this specification.

EXAMPLE 1 (COMPARATIVE)

Table 1 summarizes physical and chemical properties of the composition of Example 1 (Comparative).

Table 2 summarizes carbon number distribution of the composition of Example 1 (Comparative)

The sample composition of Example 1 was produced by hydrodeoxygenation and isomerization of feedstock of renewable origin as explained above. The isomerization step was followed by a distillation step to recover a hydrocarbon composition having an initial boiling point (IBP) 275.4° C. and a final boiling point (FBP) 321.0° C.

The carbon number distribution of the composition of Example 1 is presented in table 2. The composition comprises 96.05% i-paraffins and 3.95% n-paraffins. 97.19 wt-% of all paraffins are in the C16-C20 range. The ratio of the amount of C18 i-paraffins to the amount of C18 n-paraffins is 31.9 based on the weight of the C18 i-paraffins and the weight of the C18 n-paraffins in the composition.

As can be seen in table 1, conductivity of the composition is 161 pS/m, which means that the composition is not suitable for certain electrotechnical applications.

TABLE 1

Physical and chemical properties of a composition according to Example 1 (Comparative)

| Method | Property | Unit | |
|---|---|---|---|
| PHYSICAL & CHEMICAL PROPERTIES | | | |
| ENISO12185 | DENSITY | kg/m3 | 787.6 |
| ENISO12185 | DENS20° C. | kg/m3 | 784.1 |
| ISO2049 | COLOUR | | L 0.5 |
| ASTMD4176-1 | APPEARANCE | | CLEAR |
| ENISO2592 | Flash point-COC | ° C. | 146 |
| ENISO2719 | Flash point-PM | ° C. | 125 |
| EN14522 | AUTOIGNITION TEMP | ° C. | 211 |
| IP529 | Freezing point -AUT | ° C. | −26 |
| ASTMD7689 | Cloud point-EXACT | ° C. | −31 |
| ASTMD5950 | Pour point-ISL | ° C. | −48 |
| ENISO20846 | SULPHUR | mg/kg | <1 |
| ENISO12937 | WATER | mg/kg | 18 |
| ENISO2160 | Copper Corrosion 3 H/50° C | no | 1a |
| EN12662 | SEDIMENT-TOT | mg/kg | 6.5 |
| ISO2977 | ANILINEPOINT | ° C. | 100.3 |
| ASTMD1133 | KAURIBUTANOL | | 18.5 |
| ASTMD1218 | Refractive index-20 | | 1.4395 |
| UOP495 | AROMATICS | wt-% | 0.37 |
| ASTMD3242 | ACIDITY-TAN | mg KOH/g | 0.001 |
| ISO6297 | CONDUCTIVITY at 22° C. | pS/m | 161 |
| IP387 | FBT | | 6.83 |
| NM490A | N-PARAFFINS | wt-% | 3.95 |

TABLE 1-continued

Physical and chemical properties of a composition according to Example 1 (Comparative)

| Method | Property | Unit | |
|---|---|---|---|
| ASTMD5800-B | NOACK150 | wt-% | 8.6 |
| ASTMD971M | SURFACE-TENSION | mN/m | 27 |
| ASTMD971 | INTERFAC-TENSION | mN/m | 46 |
| ASTMD971 | TEMPERATURE | ° C. | 25 |
| VISCOSITY | | | |
| ENISO3104 | VISCO100 C. | mm2/s | 1 |
| ENISO3104 | VISCO40 C. | mm2/s | 4 |
| ENISO3104 | VISCO20 C. | mm2/s | 6 |
| ENISO3104 | VISCO10° C. | mm2/s | 9 |
| ENISO3104 | VISCO –0 C. | mm2/s | 12 |
| ENISO3104 | VISCO –10 | mm2/s | 18 |
| ENISO3104 | VISCO –20 C. | mm2/s | 30 |
| ENISO3104 | VISCO –30 C. | mm2/s | 55 |
| METALS | | | |
| NM534 | BORON | mg/kg | <1 |
| NM534 | SODIUM | mg/kg | <0.10 |
| NM534 | MAGNESIUM | mg/kg | <0.10 |
| NM534 | ALUMINIUM | mg/kg | <0.10 |
| NM534 | SILICON | mg/kg | 0.19 |
| NM534 | PHOSPHOROUS | mg/kg | <0.10 |
| NM534 | POTASSIUM | mg/kg | 0.23 |
| NM534 | CALCIUM | mg/kg | <0.10 |
| NM534 | TITANIUM | mg/kg | <0.10 |
| NM534 | VANADINIUM | mg/kg | <0.10 |
| NM534 | CHROMIUM | mg/kg | <0.10 |
| NM534 | MANGANESE | mg/kg | <0.10 |
| NM534 | IRON | mg/kg | <0.10 |
| NM534 | NICKEL | mg/kg | <0.10 |
| NM534 | COPPER | mg/kg | <0.10 |
| NM534 | ZINC | mg/kg | <0.10 |
| NM534 | MOLYBDENIUM | mg/kg | <0.10 |
| NM534 | CADMIUM | mg/kg | <0.10 |
| NM534 | TIN | mg/kg | <0.10 |
| NM534 | BARIUM | mg/kg | <0.10 |
| NM534 | LEAD | mg/kg | <0.10 |
| DISTILLATION | | | |
| ENISO3405 | DIS-IBP | ° C. | 275.4 |
| ENISO3405 | DIS-05 | ° C. | 291.7 |
| ENISO3405 | DIS-10 | ° C. | 292.2 |
| ENISO3405 | DIS-20 | ° C. | 292.8 |
| ENISO3405 | DIS-30 | ° C. | 293.2 |
| ENISO3405 | DIS-40 | ° C. | 293.7 |
| ENISO3405 | DIS-50 | ° C. | 294.2 |
| ENISO3405 | DIS-60 | ° C. | 294.7 |
| ENISO3405 | DIS-70 | ° C. | 295.5 |
| ENISO3405 | DIS-80 | ° C. | 296.7 |
| ENISO3405 | DIS-90 | ° C. | 299.4 |
| ENISO3405 | DIS-95 | ° C. | 306.5 |
| ENISO3405 | DIS-FBP | ° C. | 321 |
| ENISO3405 | DIS-RECOVERY | vol-% | 97.2 |

TABLE 2

Carbon number distribution of the composition of Example 1 (comparative)

| Carbon number | i-paraffins | n-paraffins | Total paraffins |
|---|---|---|---|
| 3 | 0.00 | 0.00 | 0.00 |
| 4 | 0.00 | 0.00 | 0.00 |
| 5 | 0.00 | 0.00 | 0.00 |
| 6 | 0.00 | 0.00 | 0.00 |
| 7 | 0.05 | 0.03 | 0.08 |
| 8 | 0.08 | 0.02 | 0.10 |
| 9 | 0.04 | 0.01 | 0.05 |
| 10 | 0.03 | 0.00 | 0.03 |
| 11 | 0.02 | 0.00 | 0.02 |
| 12 | 0.01 | 0.00 | 0.01 |
| 13 | 0.01 | 0.00 | 0.01 |
| 14 | 0.01 | 0.00 | 0.01 |
| 15 | 0.30 | 0.08 | 0.38 |
| 16 | 4.01 | 0.12 | 4.12 |
| 17 | 33.31 | 1.91 | 35.22 |
| 18 | 51.62 | 1.62 | 53.24 |
| 19 | 3.05 | 0.08 | 3.13 |
| 20 | 1.44 | 0.04 | 1.48 |
| 21 | 0.47 | 0.02 | 0.49 |
| 22 | 0.24 | 0.01 | 0.25 |

TABLE 2-continued

Carbon number distribution of the composition of Example 1 (comparative)

| Carbon number | i-paraffins | n-paraffins | Total paraffins |
|---|---|---|---|
| 23 | 0.12 | 0.00 | 0.13 |
| 24 | 0.07 | 0.00 | 0.07 |
| 25-29 | 0.78 | 0.00 | 0.78 |
| 30-36 | 0.39 | 0.00 | 0.39 |
| >C36 | 0.00 | 0.00 | 0.00 |
| Total paraffins | 96.05 | 3.95 | 100.00 |

EXAMPLE 2

Table 3 summarizes physical and chemical properties of the composition of Example 2.

Table 4 summarizes the carbon number distribution of the composition of Example 2.

The sample composition of Example 2 was produced by conducting a distillation step to the sample composition of Example 1 to recover a hydrocarbon composition having an initial boiling point (IBP) 283.5° C. and final boiling point (FBP) 298.5° C.

The carbon number distribution of the composition of Example 2 is presented in Table 4. The composition comprises 96.75% i-paraffins and 3.25% n-paraffins. 99.08 wt-% of all the paraffins are in the C16-C19 range. The ratio of the amount of C18 i-paraffins to the amount of C18 n-paraffins is 45.52 based on the weight of the C18 i-paraffins and the weight of the C18 n-paraffins in the composition.

The composition comprises 0.31 wt-% C15 and lighter paraffins and 0.62 wt-% C20 and heavier paraffins.

Table 3 summarizes physical and chemical properties of the composition of Example number 2. As can be seen from table 1, conductivity of this composition is less than 1 pS/m, which means that the composition is suitable for various electrotechnical applications. Surprisingly, even the composition of Example 2 comprises lighter paraffins compared to the composition of comparative example 1, and the volatility (NOACK150) of the composition of Example 2 is less than the volatility of the composition of comparative Example 1.

This surprising performance is the result of the distillation final boiling point selection, so that the majority of C18 normal paraffins of the composition of Example 2 have ended up in the distillation residue, as can be seen from table 4. By selecting the distillation final boiling point as described above, also the low temperature performance of the product has been substantially improved. The viscosity of the product also fulfils the requirements on such products.

Additionally biodegradability of the composition was tested according to OECD Test Guideline 301 F, and the composition was found readily biodegradable.

TABLE 3

Physical and chemical properties of a composition according to Example 2

| | PHYSICAL & CHEMICAL PROPERTIES | | |
|---|---|---|---|
| ENISO12185 | DENSITY | kg/m3 | 786.6 |
| ENISO12185 | DENS20° C. | kg/m3 | 783.2 |
| ISO2049 | COLOUR | | L 0.5 |
| ASTMD4176-1 | APPEARANCE | | C&B |
| ENISO2595 | Flash point-COC | ° C. | 149 |
| ENISO2719 | Flash point-PM | ° C. | 145 |
| EN14522 | AUTOIGNITION TEMP | ° C. | 211 |
| IP529 | Freezing point -AUT | ° C. | −22 |
| ASTMD7689 | Cloud point-EXACT | ° C. | −34 |
| ASTMD5950 | Pour point-ISL | ° C. | −69 |
| ENISO20846 | SULPHUR | mg/kg | <1 |
| ENISO12937 | WATER | mg/kg | 17 |
| ENISO2160 | Copper Corrosion 3 H/50° C. | no | 1a |
| EN12662 | SEDIMENT-TOT | mg/kg | |
| ISO2977 | ANILINEPOINT | ° C. | 99.9 |
| ASTMD1133 | KAURIBUTANOL | | 18.5 |
| ASTMD1218 | Refractive index-20 | | 1.4391 |
| UOP495 | AROMATICS | wt-% | 0.04 |
| ASTMD3242 | ACIDITY-TAN | mg KOH/g | <0.001 |
| ISO6297 | CONDUCTIVITY at 22° C. | pS/m | <1 |
| IP387 | FBT | | 1.01 |
| NM490A | N-PARAFFINS | wt-% | 3.25 |
| ASTMD5800-B | NOACK150 | wt-% | 8.4 |
| ASTMD971M | SURFACE-TENSION | mN/m | 27 |
| ASTMD971 | INTERFAC-TENSION | mN/m | 51 |
| ASTMD971 | TEMPERATURE | ° C. | 25 |
| VISCOSITY | | | |
| ENISO3104 | VISCO100 C. | mm2/s | 1 |
| ENISO3104 | VISCO40 C. | mm2/s | 4 |
| ENISO3104 | VISCO20 C. | mm2/s | 6 |
| ENISO3104 | VISCO10° C. | mm2/s | 8 |
| ENISO3104 | VISCO −0 C. | mm2/s | 12 |
| ENISO3104 | VISCO −10 | mm2/s | 18 |
| ENISO3104 | VISCO −20 C. | mm2/s | 29 |
| ENISO3104 | VISCO −30 C. | mm2/s | 52 |

TABLE 3-continued

Physical and chemical properties of a composition according to Example 2

METALS

| | | | |
|---|---|---|---|
| NM534 | BORON | mg/kg | <1 |
| NM534 | SODIUM | mg/kg | <0.10 |
| NM534 | MAGNESIUM | mg/kg | <0.10 |
| NM534 | ALUMINIUM | mg/kg | <0.10 |
| NM534 | SILICON | mg/kg | <0.10 |
| NM534 | PHOSPHOROUS | mg/kg | <0.10 |
| NM534 | POTASSIUM | mg/kg | <0.10 |
| NM534 | CALCIUM | mg/kg | <0.10 |
| NM534 | TITANIUM | mg/kg | <0.10 |
| NM534 | VANADINIUM | mg/kg | <0.10 |
| NM534 | CHROMIUM | mg/kg | <0.10 |
| NM534 | MANGANESE | mg/kg | <0.10 |
| NM534 | IRON | mg/kg | <0.10 |
| NM534 | NICKEL | mg/kg | <0.10 |
| NM534 | COPPER | mg/kg | <0.10 |
| NM534 | ZINC | mg/kg | <0.10 |
| NM534 | MOLYBDENIUM | mg/kg | <0.10 |
| NM534 | CADMIUM | mg/kg | <0.10 |
| NM534 | TIN | mg/kg | <0.10 |
| NM534 | BARIUM | mg/kg | <0.10 |
| NM534 | LEAD | mg/kg | <0.10 |

DISTILLATION

| | | | |
|---|---|---|---|
| ENISO3405 | DIS-IBP | ° C. | 283.5 |
| ENISO3405 | DIS-05 | ° C. | 291.1 |
| ENISO3405 | DIS-10 | ° C. | 291.5 |
| ENISO3405 | DIS-20 | ° C. | 291.9 |
| ENISO3405 | DIS-30 | ° C. | 292.2 |
| ENISO3405 | DIS-40 | ° C. | 292.3 |
| ENISO3405 | DIS-50 | ° C. | 292.6 |
| ENISO3405 | DIS-60 | ° C. | 293.1 |
| ENISO3405 | DIS-70 | ° C. | 293.6 |
| ENISO3405 | DIS-80 | ° C. | 294.2 |
| ENISO3405 | DIS-90 | ° C. | 295.2 |
| ENISO3405 | DIS-95 | ° C. | 296.4 |
| ENISO3405 | DIS-FBP | ° C. | 298.5 |
| ENISO3405 | DIS-RECOVERY | vol-% | 98 |

TABLE 4

Carbon number distribution of the composition of Example 2

| Carbon number | i-paraffins | n-paraffins | Total paraffins |
|---|---|---|---|
| 3 | 0.00 | 0.00 | 0.00 |
| 4 | 0.00 | 0.00 | 0.00 |
| 5 | 0.00 | 0.00 | 0.00 |
| 6 | 0.00 | 0.00 | 0.00 |
| 7 | 0.00 | 0.00 | 0.00 |
| 8 | 0.00 | 0.00 | 0.00 |
| 9 | 0.00 | 0.00 | 0.00 |
| 10 | 0.00 | 0.00 | 0.00 |
| 11 | 0.00 | 0.00 | 0.00 |
| 12 | 0.00 | 0.00 | 0.00 |
| 13 | 0.00 | 0.00 | 0.00 |
| 14 | 0.01 | 0.00 | 0.02 |
| 15 | 0.22 | 0.08 | 0.29 |
| 16 | 3.66 | 0.42 | 4.08 |
| 17 | 37.42 | 1.51 | 38.93 |
| 18 | 53.27 | 1.17 | 54.44 |
| 19 | 1.58 | 0.04 | 1.63 |
| 20 | 0.45 | 0.03 | 0.48 |
| 21 | 0.10 | 0.00 | 0.10 |
| 22 | 0.03 | 0.00 | 0.04 |
| 23 | 0.00 | 0.00 | 0.00 |
| 24 | 0.00 | 0.00 | 0.00 |
| 25-29 | 0.00 | 0.00 | 0.00 |
| 30-36 | 0.00 | 0.00 | 0.00 |
| >C36 | 0.00 | 0.00 | 0.00 |
| Total paraffins | 96.75 | 3.25 | 100.00 |

It will be obvious to a person skilled in the art, as the technology advances, that the inventive concept of the present invention can be implemented in various ways. The invention and its embodiments are not limited to the examples described above but may vary within the scope of the claims.

What is claimed is:

1. An electrotechnical fluid composition, comprising:
paraffins in a C17-C18 range,
wherein the composition comprises more than 45 wt-% C18 paraffins, based on the total weight of the composition; and
wherein the composition has a boiling range selected within a range from 275° C. to 300° C. (EN ISO3405: 2011); and
wherein the composition has 35-40 wt-% C17 paraffins, based on the total weight of the composition; and wherein the composition has 0.5-2 wt-% C17 n-paraffins, 0 and 0.01-1 wt-% C18 n-paraffins.

2. The electrotechnical fluid composition according to claim 1, wherein the composition comprises:
   less than 95 wt-% paraffins in the C17-C18 range, based on the total weight of the composition.

3. The electrotechnical fluid composition according to claim 1, wherein a total isoparaffinic content of the composition is more than 90 wt-%, based on the total weight of the composition.

4. The electrotechnical fluid composition according to claim 1, wherein the composition comprises:
   less than 2 wt-% C15 and lighter paraffins and less than 2 wt-% C20 and heavier paraffins, based on the total weight of the composition.

5. The electrotechnical fluid composition according to claim 1, wherein the composition has a flash point selected to be at least 135° C. (ENISO2719:2016).

6. The electrotechnical fluid composition according to claim 1, wherein the composition comprises:
   more than 37 wt-% C17 paraffins, based on the total weight of the composition.

7. The electrotechnical fluid composition according to claim 1, wherein the composition comprises:
   less than 42 wt-% C17 paraffins, based on the total weight of the composition.

8. The electrotechnical fluid composition according to claim 1, wherein the composition has a boiling range selected within a range from 280° C. to 300° C. (EN ISO3405:2011).

9. The electrotechnical fluid composition according to claim 1, wherein the composition comprises:
   less than 57 wt-% C18 paraffins, based on the total weight of the composition.

10. The electrotechnical fluid composition according to claim 1, wherein a ratio of an amount of C17 i-paraffins to an amount of C17 n-paraffins is selected to be greater than 20 and less than 30, based on a weight of the C17 i-paraffins and a weight of the C17 n-paraffins in the composition.

11. The electrotechnical fluid composition according to claim 1, wherein the composition is selected to comprise at last one or more of:
   0.01-1 wt-% aromatics based on the total weight of the composition.

12. An electrotechnical fluid composition, comprising:
   more than 90 wt-% paraffins in a C17-C18 range based on a total weight of the composition,
   wherein a ratio of an amount of C18 i-paraffins to an amount of C18 n-paraffins is more than 40 based on a weight of the C18 i-paraffins and a weight of the C18 n-paraffins in the composition; and
   3-4 wt-% C16 i-paraffins, 35-40 wt-% C17 i-paraffins, 50-55 wt-% C18 i-paraffins, 1-3 wt-% C19 i-paraffins, 0.1-1 wt-% C16 n-paraffins, 0.5-2 wt-% C17 n-paraffins, 0.5-2 wt-% C18 n-paraffins and 0.01-1 wt-% C19 n-paraffins, based on the total weight of the composition.

13. The electrotechnical fluid composition according to claim 1, wherein a total isoparaffinic content of the composition is less than 98 wt-%, based on the total weight of the composition.

14. The electrotechnical fluid composition according to claim 1, wherein the ratio of the amount of C18 i-paraffins to the amount of C18 n-paraffins is between 42 and 47, based on the weight of the C18 i-paraffins and the weight of the C18 n-paraffins in the composition.

15. The electrotechnical fluid composition according to claim 1, wherein a conductivity at 22° C. (ISO6297:1997) is less than 1 pS/m and NOACK150 (ASTMD5800-B) is 8.5 wt-% or less.

16. The electrotechnical fluid composition according to claim 1, wherein a density at 20° C. (EN ISO12185) is between 782 kg/m$^3$ and 784 kg/m$^3$, and a cloud point (ASTMD7689:2017) is lower than −32° C.

17. The electrotechnical fluid composition according to claim 1, wherein the composition has a biogenic carbon content selected to be more than 50 wt-%.

18. An electrotechnical fluid composition, comprising:
   more than 90 wt-% paraffins in a C17-C18 range, based on a total weight of the composition,
   wherein a ratio of an amount of C18 i-paraffins to an amount of C18 n-paraffins is more than 40, based on a weight of the C18 i-paraffins and a weight of the C18 n-paraffins in the composition;
   wherein the composition comprises more than 45 wt-% C18 paraffins, based on the total weight of the composition; and
   wherein the composition has a boiling range selected within a range from 275° C. to 300° C. (EN ISO3405:2011); and
   wherein the composition has at least 0.5 wt-% C16 n-paraffins, at least 1 wt-% C17 n-paraffins, at least 1 wt-% C18 n-paraffins and at least 0.5 wt-% C19 n-paraffins.

19. The electrotechnical fluid composition of claim 18, wherein the composition comprises at most 2 wt-% C19 paraffins based on the total weight of the composition.

* * * * *